United States Patent
Ho

(10) Patent No.: US 7,349,433 B2
(45) Date of Patent: Mar. 25, 2008

(54) SIGNALING FOR PARAMETERIZED QUALITY OF SERVICE (QOS) SUPPORT

(75) Inventor: Jin-Meng Ho, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 941 days.

(21) Appl. No.: 10/118,803

(22) Filed: Apr. 9, 2002

(65) Prior Publication Data
US 2003/0081547 A1    May 1, 2003

Related U.S. Application Data

(60) Provisional application No. 60/335,553, filed on Nov. 1, 2001.

(51) Int. Cl.
*H04J 3/16* (2006.01)
(52) U.S. Cl. ............ 370/469; 370/252; 370/465; 370/328; 370/338
(58) Field of Classification Search ........... 370/229, 370/241, 230, 235, 338, 349, 328, 395.4, 370/469, 333, 473, 395.21, 466, 395.5, 445, 370/428, 468, 348, 332, 310, 315, 347, 350, 370/395.2, 401, 463, 395.42, 464, 465, 470, 370/462, 432, 329, 330, 331, 233, 335, 230.1, 370/236, 322, 352, 443, 444, 455
See application file for complete search history.

(56) References Cited

U.S. PATENT DOCUMENTS 6,804,222 B1 * 10/2004 Lin et al. .................. 370/338

(Continued)

FOREIGN PATENT DOCUMENTS

WO    WO 01/28160 A    4/2001

(Continued)

OTHER PUBLICATIONS

Kuo, Geng-Sheng, et al., "Dynamic RSVP for Mobile IPV6 in Wireless Networks," VTC 2000—Spring 2000 51st Vehicular Tehnology Conference Proceedings, Tokyo, Japan, May 15-18, 2000, IEEE Vehicular Technology Conference, New York, NY: IEEE US vol. 1 of 3, Conf. 51, May 15, 2000, XP000970660, pp. 455-459.

(Continued)

*Primary Examiner*—Wing Chan
*Assistant Examiner*—Michael J. Moore
(74) *Attorney, Agent, or Firm*—Steven A. Shaw; W. James Brady; Frederick J. Telecky, Jr.

(57) ABSTRACT

The creation, modification, and deletion of a traffic stream 224 with parameterized QoS expectations between two communicating stations 205 and 207, when there is no built-in mechanism for support of parameterized QoS expectations, requires signaling of traffic characteristics and QoS parameters between the management entities such as SME 212 and MLME 214 and between the MAC entities of the communicating stations 205 and 207. Either the station 205 and 207 or a hybrid coordinator may initiate the signaling. The end result of the signaling is the creation of a new traffic stream that is used to associate user traffic to a particular set of traffic characteristics and QoS parameters, which are then used in the scheduling of the transmission of the user traffic. Another end result of the signaling is the modification of an existing traffic stream in terms of its traffic characteristics and QoS parameters.

42 Claims, 8 Drawing Sheets

U.S. PATENT DOCUMENTS

| | | | |
|---|---|---|---|
| 6,850,981 B1* | 2/2005 | Ho et al. | 709/227 |
| 6,862,270 B1* | 3/2005 | Ho | 370/328 |
| 6,950,397 B1* | 9/2005 | Ho et al. | 370/235 |
| 6,970,422 B1* | 11/2005 | Ho et al. | 370/230 |
| 6,985,465 B2* | 1/2006 | Cervello et al. | 370/333 |
| 6,999,442 B1* | 2/2006 | Ho et al. | 370/338 |
| 7,079,508 B2* | 7/2006 | Ayyagari et al. | 370/329 |
| 7,123,628 B1* | 10/2006 | Hwang et al. | 370/469 |
| 2002/0060995 A1* | 5/2002 | Cervello et al. | 370/332 |
| 2002/0067696 A1* | 6/2002 | Ho | 370/235 |
| 2002/0141376 A1* | 10/2002 | Kandala | 370/348 |
| 2002/0188723 A1* | 12/2002 | Choi et al. | 709/225 |

FOREIGN PATENT DOCUMENTS

WO     WO 01/56319 A     8/2001

OTHER PUBLICATIONS

Braden, R., et al., "Resource ReSerVation Protocol," RFC 2205, IETF: Internet Engineering Task Force, Sep. 1, 1997, XP002199929, pp. 1-112.

* cited by examiner

FIG. 3c
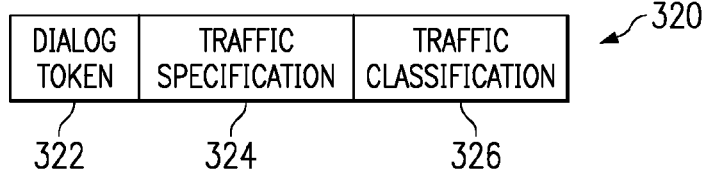
FIG. 3d
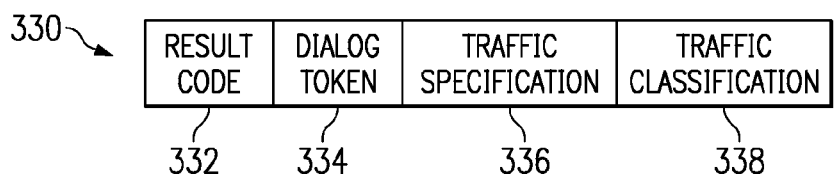
FIG. 3e
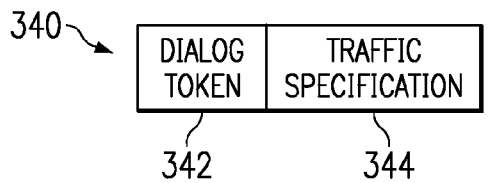
FIG. 3f
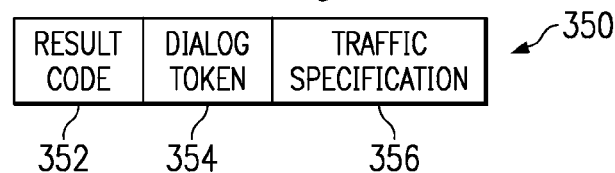
FIG. 3g
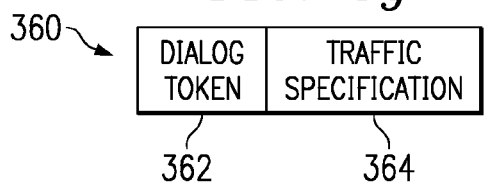
FIG. 3h
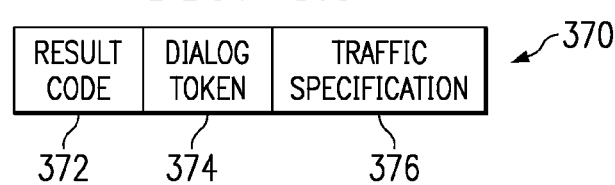
FIG. 4a
| OCTETS: 1 | 1 | 1 | 1 | 0-2300 |
|---|---|---|---|---|
| CATEGORY CODE | ACTION CODE (EVEN) | ACTIVATION DELAY | DIALOG TOKEN | ACTION-SPECIFIC FIXED FIELDS AND/OR ELEMENTS |
| 402 | 404 | 406 | 408 | 410 |

| OCTETS: 1 | 1 | 1 | 1 | 0-2300 |
|---|---|---|---|---|
| CATEGORY CODE | ACTION CODE (ODD) | ACTION-SPECIFIC STATUS | DIALOG TOKEN | ACTION-SPECIFIC FIXED FIELDS AND/OR ELEMENTS |
| 422 | 424 | 426 | 428 | 430 |

| CODE | MEANING |
|---|---|
| 0 | ADD TS REQUEST |
| 1 | ADD TS RESPONSE |
| 2 | DEL TS |
| 3 | RESERVED |
| 4-255 | RESERVED |

FIG. 4d

| OCTETS: 1 | 1 | 1 | 1 | 30 | 0-2270 |
|---|---|---|---|---|---|
| CATEGORY CODE (1) | QoS ACTION CODE (0 OR 1) | 0 | DIALOG TOKEN | TSPEC ELEMENT | TCLAS ELEMENT |
| 402 | 404 | 406 | 408 | 410 | |

FIG. 4e

| OCTETS: 1 | 1 | 1 | 1 | 30 |
|---|---|---|---|---|
| CATEGORY CODE (1) | QoS ACTION CODE (2) | 0 | DIALOG TOKEN | TSPEC ELEMENT |
| 402 | 404 | 406 | 408 | 410 |

FIG. 6a
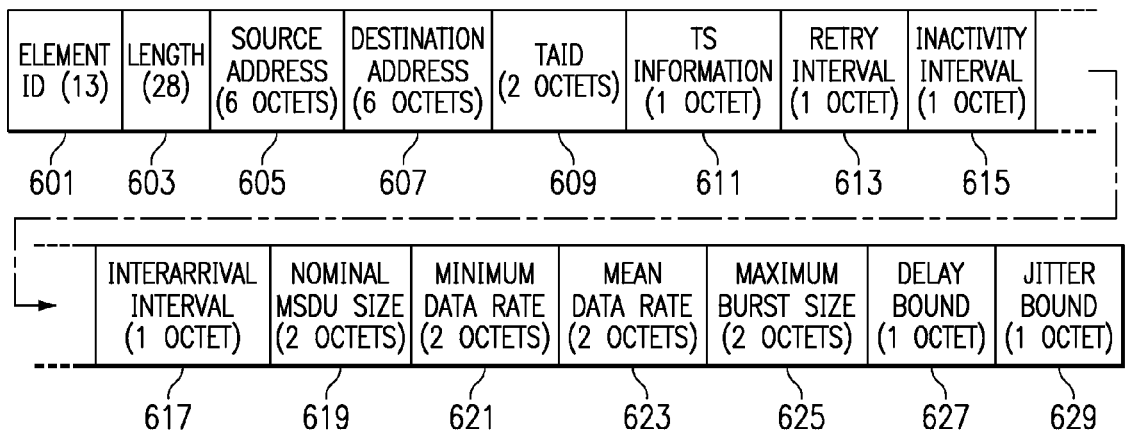
FIG. 6b
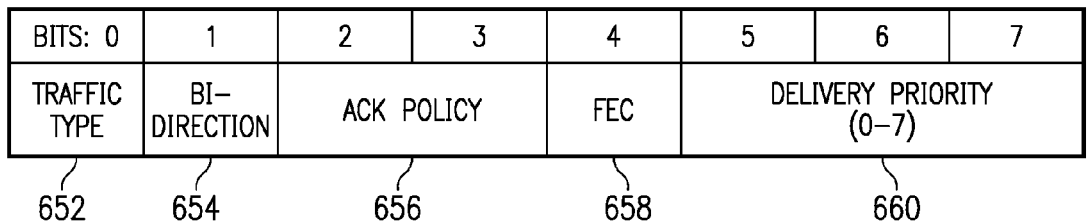
FIG. 7
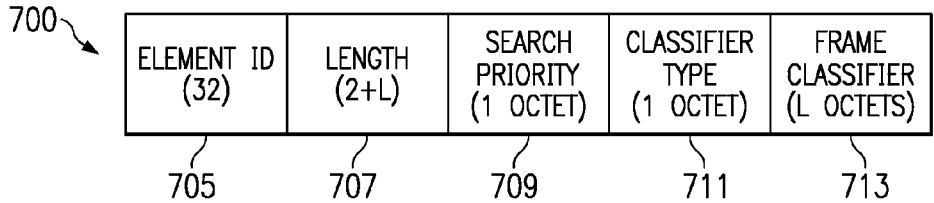
FIG. 8a
| QoS ACTION PRIMITIVE/FRAME | SOURCE/DESTINATION ENTITY | |
|---|---|---|
| MLME-ADDTS.REQUEST | HC(SME) -> HC(MAC) | 802 |
| ADD TS REQUEST ACTION FRAME | HC(MAC) -> WSTA(MAC) | 804 |
| ACK FRAME | WSTA(MAC) -> HC(MAC) | 806 |
| MLME-ADDTS.CONFIRM | HC(MAC) -> HC(SME) | 808 |
| MLME-ADDTS.INDICATION | WSTA(MAC) -> WSTA(SME) | 810 |

FIG. 8b

| QoS ACTION PRIMITIVE/FRAME | SOURCE/DESTINATION ENTITY | |
|---|---|---|
| MLME-DELTS.INDICATION | HC(MAC) -> HC(SME) | 812 |
| MLME-DELTS.RESPONSE | HC(SME) -> HC(MAC) | 814 |
| DEL TS ACTION FRAME | HC(MAC) -> WSTA(MAC) | 816 |
| ACK FRAME | WSTA(MAC) -> HC(MAC) | 818 |
| MLME-DELTS.INDICATION | WSTA(MAC) -> WSTA(SME) | 820 |

FIG. 8c

| QoS ACTION PRIMITIVE/FRAME | SOURCE/DESTINATION ENTITY | |
|---|---|---|
| MLME-DELTS.REQUEST | WSTA1(SME) -> WSTA1(MAC) | 822 |
| DEL TS ACTION FRAME | WSTA1(MAC) -> HC(MAC) | 824 |
| ACK FRAME | HC(MAC) -> WSTA1(MAC) | 826 |
| MLME-DELTS.CONFIRM | WSTA1(MAC) -> WSTA1(SME) | 828 |
| MLME-DELTS.INDICATION | HC(MAC) -> HC(SME) | 830 |
| MLME-DELTS.RESPONSE | HC(SME) -> HC(MAC) | 832 |
| DEL TS ACTION FRAME | HC(MAC) -> WSTA2(MAC) | 834 |
| ACK FRAME | WSTA2(MAC) -> HC(MAC) | 836 |
| MLME-DELTS.INDICATION | WSTA2(MAC) -> WSTA2(SME) | 838 |

FIG. 9

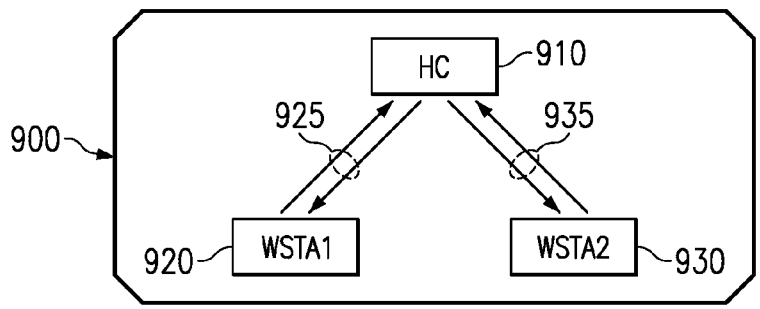

SIGNALING FOR PARAMETERIZED QUALITY OF SERVICE (QOS) SUPPORT

This application claims priority to the provisional application entitled "Signaling for Parameterized QoS Support", filed Nov. 1, 2001, Ser. No. 60/335,553, which provisional application is incorporated herein by reference.

FIELD OF THE INVENTION

This invention relates generally to wireless networking, and particularly to providing quality of service (QoS) to a digital wireless communications network through the specification and exchange of QoS parameters for network traffic transfers.

BACKGROUND OF THE INVENTION

Communications networks use a transmission medium to transmit information in the form of computer data, voice, music, video, etc., from one station to another. The communications medium may be a wired link, a fiber optic link, or a wireless link. The wireless link may include, but is not limited to, radio frequency, infrared, laser light, and microwave. The network may, in fact, use a combination of different types of communications links.

With the exception of a small number of networks that use dedicated communications links between each station, most information networks use a shared transmission medium to carry the transmitted information. Examples of information networks using a shared transmission medium include: Ethernet, token ring, wireless Ethernet (IEEE 802.11), and many proprietary networks.

However, by sharing a communications medium between multiple stations, there are situations that arise when stations are required to wait a significant amount of time before they are able to transmit their data. Additionally, situations exist when simultaneous transmissions from different stations occur and result in the mutual destruction of the transmissions. Such situations are undesirable in providing quality of service (QoS) to multimedia, voice, and data transfers and in making efficient use of scarce spectrum on a wireless medium.

For some applications, such as voice telephony, video tele-conferencing, and other real-time, bidirectional, interactive applications, extended transfer times can severely and rapidly degrade the performance of the applications to a level that is unacceptable. For example, in voice telephony applications, if the delay between one user speaking and another user listening is greater than a few milliseconds, the delay becomes noticeable to the users and the users' satisfaction level for the telephone connection begins to drop.

One way to ensure that applications requiring a low maximum network latency receive the level of service that they require is to implement some form of QoS transfers of data traffic between stations. In many networks with QoS transfers, communications traffic in a network is partitioned into multiple categories and streams. The categories are prioritized while the streams are parameterized according to their specific performance requirements and traffic characteristics. For example, traffic carrying a telephone conversation between two users will be given a higher priority than traffic carrying data for a file transfer between two computers; whereas traffic carrying a teleconferencing video will be parameterized differently from traffic carrying a television video in terms of their data rate and delay requirements. By prioritizing categories and parameterizing streams for the traffic, traffic of higher priority or higher QoS demands receives better service, and hence these networks offer and meet performance guarantees.

However, traffic categories, as implemented in an IEEE 802.11e wireless communications network, provide only a fixed (static) priority for messages in the differing categories. All messages of a given traffic category share a single priority level. Given a fixed number of different traffic categories, it may not be possible to provide the necessary level of prioritization to meet individual QoS demands. A finer level of differentiation between messages is required, and a fixed priority method, such as traffic categories, does not provide the needed flexibility to specify different communications parameters on a message-by-message basis. Additionally, the ability to change, on the fly, a message's parameters as network conditions and requirements change can greatly enhance the network's performance.

A need has therefore arisen for a methodology that permits the specification of various communications parameters on a message-by-message basis and the exchange and negotiation of the communications parameters between communicating stations as dictated by performance needs and bandwidth availability.

SUMMARY OF THE INVENTION

In one aspect, the present invention provides a method for initiating a QoS action on a traffic stream with parameterized QoS expectations at a first communications station in a communications network, wherein the first communications station comprising a higher layer signaling unit, a station management entity (SME), a medium access control (MAC) sublayer management entity (MLME), a physical (PHY) layer management entity (PLME), a MAC sublayer, a PHY layer, the method comprising the steps: sending a QoS action signal from the higher layer signaling unit to the SME of the first station, creating a first QoS action primitive, the first QoS action primitive comprising a first QoS action frame body, at the SME of the first station and issuing the first QoS action primitive to the MLME of the first station, transmitting the first QoS action frame to a second station, receiving an acknowledgment from the second station, creating a second QoS action primitive at the MAC sublayer of the first station, and issuing the second QoS action primitive to the SME of the first station.

The present invention provides a number of advantages. For example, use of a preferred embodiment of the present invention allows the specification of different communications parameters based on the needs of the individual messages. This allows for each individual message to have a different set of parameters, providing the network with a high degree of flexibility to meet differing QoS expectations and controllability to transfer user traffic based on the overall demands.

Also, use of a preferred embodiment of the present invention allows the exchange and negotiation of QoS parameters for traffic streams, allowing the network to meet various performance requirements and traffic conditions.

Additionally, use of a preferred embodiment of the present invention permits the renegotiation of QoS parameters after an initial assignment of QoS parameters should the assigned QoS parameters not meet (or exceed) the needs or expectations of the communicating parties.

BRIEF DESCRIPTION OF THE DRAWINGS

The above features of the present invention will be more clearly understood from consideration of the following descriptions in connection with accompanying drawings in which:

FIGS. 3a-h illustrate the structure of various QoS action frame bodies and primitive parameters according to a preferred embodiment of the present invention;

FIGS. 4a-e illustrate the structure of action frame bodies (for both request and response) for adding, modifying, and deleting traffic streams according to a preferred embodiment of the present invention;

FIGS. 6a-b illustrate the structure of a traffic specification element used to specify traffic characteristics and QoS parameters for a traffic stream according to a preferred embodiment of the present invention;

FIG. 7 illustrates the structure of a traffic classification element used for associating data units to their traffic streams according to a preferred embodiment of the present invention;

FIGS. 8a-c illustrate exemplary sequences of QoS action primitives and action frames in the addition, modification, and deletion of traffic streams between management or MAC entities in communicating stations according to a preferred embodiment of the present invention; and FIG. 9 illustrates exemplary uses of traffic streams according to a preferred embodiment of the present invention.

DETAILED DESCRIPTION OF ILLUSTRATIVE EMBODIMENTS

Figure 1:
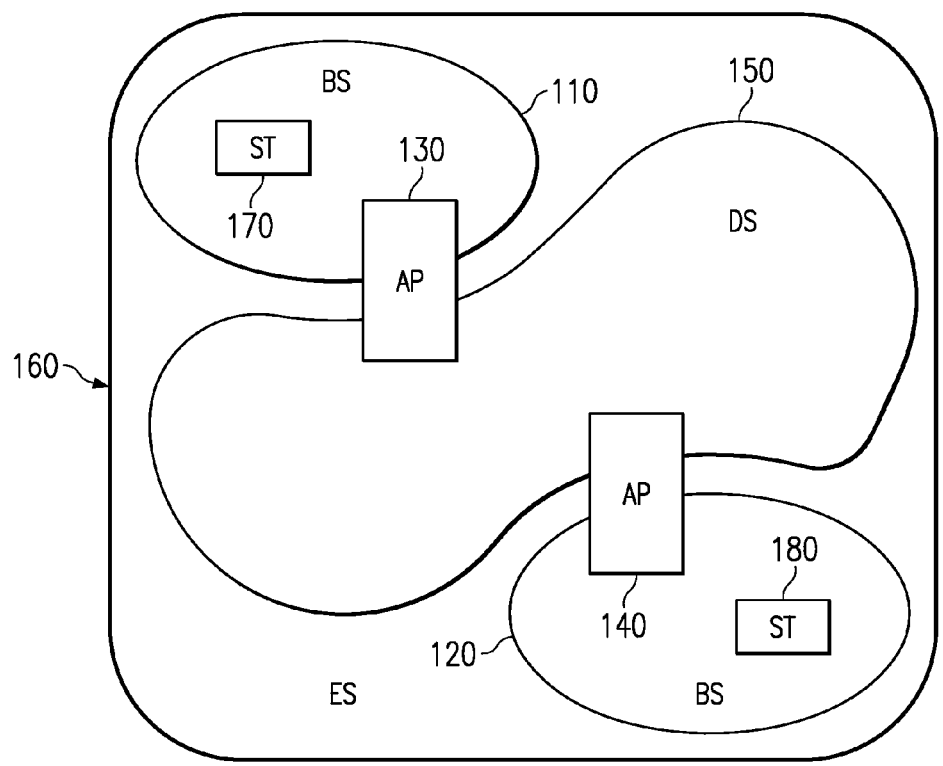
FIG. 1 illustrates a prior art diagram of a typical wireless local area network adherent to the IEEE 802.11 technical standard.

The making and use of the various embodiments are discussed below in detail. However, it should be appreciated that the present invention provides many applicable inventive concepts, which can be embodied in a wide variety of specific contexts. The specific embodiments discussed are merely illustrative of specific ways to make and use the invention, and do not limit the scope of the invention.

Sharing a communications medium is a necessity for a majority of the communications networks (networks) available today. Only in a small number of networks are there enough resources to permit dedicating communications media between pairs of users (or stations). For most purposes, dedicating a connection between pairs of users is an inefficient use of bandwidth resources. Sharing a communications medium between multiple users allows for more efficient use of the medium, because when one user may be idle, another user may have data to transmit. Sharing is also more cost efficient because a smaller amount of the media is needed to support the information network. Note that this is also true for wireless, over-the-air networks, where if sharing were not used, then more "air", i.e., spectrum, must be dedicated to supporting the network.

However, sharing a communications medium between multiple stations means that in certain circumstances, more than one station could desire access to the medium at the same time or a station may desire access when the medium is already busy. This is known as contention and contention leads to collision and waiting. Because only one station should have access to the communications medium at any given time, the other stations with data to transmit should wait until the first station is either finished transmitting or its allotted time is expired. However, since the stations do not have other channels over which they can coordinate their transmission times other than the channel they use for their data transmissions, the stations may transmit at the same time resulting in no data being successfully received. Such collisions waste channel bandwidth and further delay the traffic transfer.

Long delays lead to communications with large latencies. There are many communications applications that cannot tolerate high network latency. Examples include voice telephony applications, video tele-conferencing, monitoring, and other real-time, bi-directional and interactive applications. These applications require a network that provides a low maximum network latency, a minimal data transfer rate, and other QoS expectations.

QoS expectations may be met in a qualitative or quantitative way. In a qualitative way, user traffic in the network is prioritized into traffic categories and transferred according to the relative QoS priorities. User traffic with low latency requirements are assigned higher priorities to ensure that they are serviced before user traffic with less stringent latency requirements, and hence the higher priority traffic is required to wait less in relative terms. Traffic with lower priorities are sometimes required to wait an extended amount of time, but only applications that are not sensitive to extended wait-times are assigned low priorities. Applications such as data and file transfers are assigned low priorities, while applications such as voice and video transmissions are assigned high priorities. In a quantitative way, user traffic in the network is parameterized into traffic streams and transferred according to the specific QoS parameters defined in the corresponding traffic specifications. Such QoS parameters may be data rates, delay bounds, jitter bounds, etc., required for the data transfer of the traffic streams between communicating stations. For example, applications such as voice may have lower data rate but larger delay bound parameter values than applications such as video.

The discussion below is focused on a wireless communications network, especially to wireless communications networks adherent to an IEEE 802.11e technical standard. However, the present invention has applicability to other communications networks, both wired and wireless, that do not have built-in support for parameterized QoS expectations. Examples of such networks include, but are not limited to: Ethernet, HyperLan, Bluetooth, HomeRF, etc.

Referring now to FIG. 1, a diagram (prior art) of a typical wireless local area network (LAN) installation according to the IEEE 802.11-1999 technical standard, "ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications," which is incorporated herein by reference. A draft supplement to the IEEE 802.11 technical standard, "Draft Supplement to Standard for Telecommunications and information exchange between systems—LAN/MAN specific requirements—Part 11—Wireless Medium Access Control (MAC) and physical layer (PHY) specifications: Medium Access Control (MAC) Enhancements for Quality of Service (QoS), IEEE 802.11e/D2.0a, November 2001," which is also incorporated herein by reference. FIG. 1 provides an illustration of the basic building blocks of an IEEE 802.11 network.

FIG. 1 displays a first basic service set (BSS) 110 and a second BSS 120. A BSS is the basic building block of an IEEE 802.11 network and can be thought of as a coverage area within which member stations may participate in direct communications. A BSS is started, formed, and maintained by an access point (AP). BSS 110 corresponds to AP 130 and BSS 120 corresponds to AP 140. An AP is a station that is connected to a distribution system (DS) 150. A DS allows multiple BSSs to interconnect with one another and form an extended service set (ESS) 160. The medium used in a DS may be the same as the medium used in the BSSs or it may be different, e.g., the medium used in the BSSs may be wireless radio frequency (RF) while a DS may use fiber optic. Internal to BSS 110 is an AP 130 and a wireless station (STA) 170 while internal to BSS 120 is an AP 140 and a STA 180. A BSS may contain more than two stations (e.g., a maximum of about 20 stations per BSS is typical today), but it will have one AP.

As shown in FIG. 1, BSS 110 is connected to DS 150 via the access point 130 and the second access point 140 connects BSS 120 to DS 150. It should be noted that an access point also contains a wireless station and can be addressed like any other wireless station.

Stations within a BSS, for example, stations 130 and 170 in BSS 110, may communicate with one another without interfering with stations in other BSSs. However, the stations within a BSS cannot simply communicate whenever they wish; they must follow an established set of rules designed to minimize collisions and maximize performance.

A user may be thought of as a station or an entity that uses a station to communicate with other users who are using other stations to communicate. Therefore, in the remainder of this discussion, the terms stations and users will be used interchangeably without loss of information.

In an IEEE 802.11 wireless LAN, data, management, and control traffic are transmitted in what are called "units." Data and control traffic transmitted between two stations are called Medium Access Control (MAC) protocol data units (MPDU), while management traffic transmitted between two stations are called MAC management protocol data units (MMPDU). A unit may be fragmented if it is too large to fit within a single MAC frame and therefore may be fragmented into multiple MAC frames.

Timing is a crucial aspect of an IEEE 802.11 wireless LAN. Spans of time are used to prevent or allow certain types of communications. Other spans of time are used to begin and end communications. The most commonly referred time spans are SIFS, PIFS, and DIFS. A SIFS is a short inter-frame space and is typically the smallest time span in the LAN. A PIFS is a point coordinating function (PCF) inter-frame space. A PIFS is equal to one SIFS plus one slot time. A DIFS is a distributed coordinating function (DCF) inter-frame space. A DIFS is equal to one PIFS plus one slot time. A slot time is the maximum amount of time for a station to sense a frame, due to signal processing delay and propagation delay that is transmitted from any other station within a BSS.

By segregating messages into different traffic categories, each with a different priority, it is possible to give preferential treatment to traffic categories that require preferential treatment to meet QoS expectations. However, there are instances when fixed priorities provided by traffic categories are not sufficient to meet the QoS expectations. For example, there are times when there are multiple messages in a same traffic category where one message requires more bandwidth than another or it needs a lower delay bound, etc. To meet these different needs, a method that permits specification of QoS parameters for individual messages is needed. An example of such a situation is when there are simultaneously two connections present in the network, with the first connection being a voice only conversation between two users and the second connection being a videoconference between two users. It should be readily evident that both connections require low latency, but while the voice connection requires a relatively small bandwidth, the videoconference requires a significantly greater bandwidth.

Additionally, the static nature of traffic categories does not present well when network conditions change or QoS expectations change. For example, in a lightly loaded network, an improperly prioritized communications link may be able to meet the QoS expectations, but should the network become heavily loaded, the same priority may not be able to provide the required performance. Therefore, a dynamic method to assign QoS expectations that allows adaptation to the values of the QoS parameters is needed.

Therefore, traffic categories are inadequate when it comes to providing parameterized QoS. Traffic categories may be thought of as groups of MAC service data units (MSDU) that are to be delivered through the use of a prioritized QoS, whose priority is indicated by its own traffic category identifier (TCID) via a predefined priority mapping. A new construct, traffic streams, on the other hand, permits either uni- or bi-directional streams of MSDUs that are subject to QoS parameters provided by higher layer signaling mechanisms. The parameterized QoS are indicated by its traffic stream's identifier (TSID) and are assigned to the traffic stream via QoS management actions.

Traffic streams are added, modified, and deleted through the use of QoS action primitives issued by a station management entity (SME) and QoS action frames contained therein. The QoS action primitives are issued by either the source or the destination station of the traffic stream. The QoS action primitives may be issued also by a hybrid coordinator (HC) serving the source and destination stations of the traffic stream. The SME may be thought of as a layer-independent entity and is responsible for functions such as gathering layer-dependent status from higher layer entities capable of QoS signaling and from other layer management entities such as the MAC sublayer management entity (MLME) and the PHY layer management entity (PLME) and then processing the values of the layer-specific parameters. The SME would perform such functions on the behalf of general management entities and implement standard management protocols. The MLME and PLME, on the other hand, provide layer-dependent management services and functions for the MAC and PHY, respectively.

Traffic streams permit either unidirectional or bi-directional transfer of MSDUs between communicating stations with a parameterized QoS. Bi-directional traffic streams may be visualized as two unidirectional traffic streams with the source and destination communicating stations reversed but with the same traffic characteristics and QoS parameter values. The communicating stations may be a wireless station (WSTA) and a hybrid coordinator (HC), two WSTAs, or a WSTA or an HC and a multicast or broadcast group of stations.

Figure 2A:
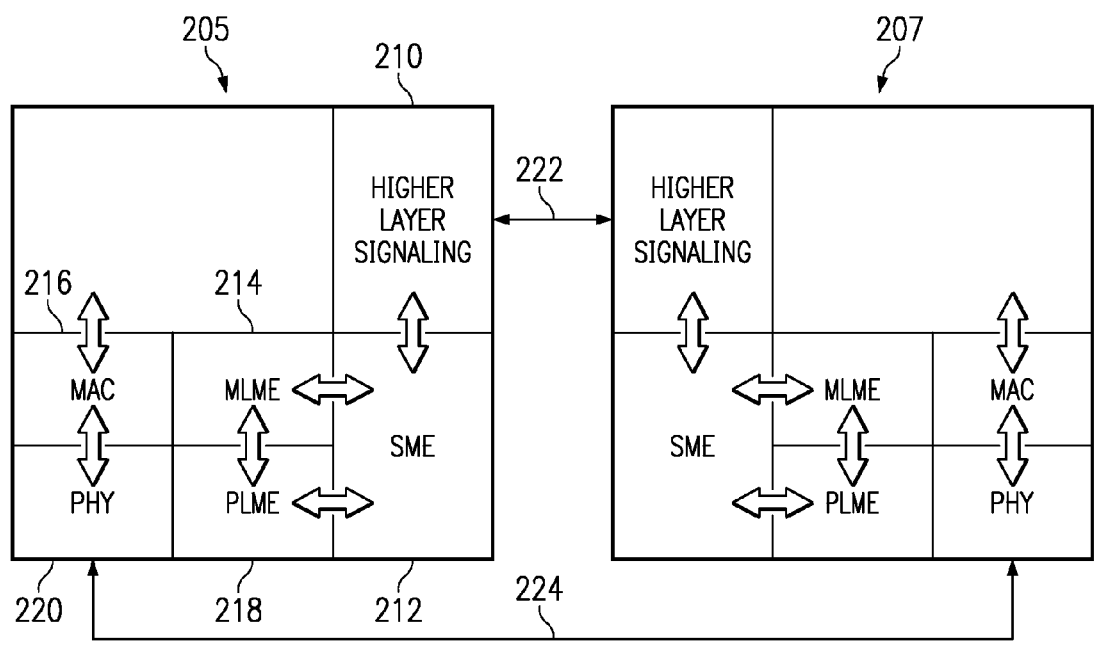
FIGS. 2a and 2b illustrate the creation, modification, or deletion of traffic streams among communicating stations according to a preferred embodiment of the present invention.

Referring now to FIG. 2a, a diagram illustrates the creation, modification, or deletion of a traffic stream between two communicating stations according to a preferred embodiment of the present invention. A communicating station 205, which in this example is an HC, is shown communicating to a second station 207, which is a WSTA in this example. Both stations are displayed partitioned into their functional units. However, in general, a communicating station that initiates signaling for adding, modifying, or deleting a traffic stream may be either an HC or a WSTA. A generic term used to mean both an HC and a WSTA is a QoS station (QSTA). The HC 205 comprising a higher layer signaling unit 210, a station management entity (SME) 212, a MAC sublayer management entity (MLME) 214, a MAC sublayer 216, a PHY layer management entity (PLME) 218, and a PHY layer 220.

The higher layer signaling unit 210, lying above the MAC sublayer, signals the arrival of a new traffic stream, change of an existing traffic stream, or deletion of an existing traffic stream through the use of predefined signaling parameters. The higher layer signaling unit 210 may be a signaling mechanism (such as a button on a remote control or lifting a telephone receiver off-hook) or a signaling protocol (such as tip and ring signaling used in existing telephone networks), for example.

According to the IEEE 802.11-1999 technical specifications, the actual transmission of the data occurs without knowledge of any specially assigned priorities and/or QoS expectations. However, in order to meet QoS expectations, the MAC entity at the HC needs to know the QoS expectations of the traffic streams existing within the BSS containing that HC in order to allocate appropriate channel bandwidth at appropriate times for the data transfer of those traffic streams in accordance with the QoS expectations. The MAC entities at the source of the traffic streams also need to know the QoS expectations so that the data from different traffic streams sourced within the same station are transmitted in appropriate order using appropriate channel bandwidth in line with the QoS expectations. With the fixed priorities of traffic categories, the priorities may be indicated directly by a traffic category identifier (TCID) attached to each data unit to be transferred. However, the parameterized QoS expectations of traffic streams do not permit the indication of QoS parameters for the various traffic streams in a fashion similar to the static priorities of the traffic categories. Therefore, the parameterized QoS expectations need to be communicated to the MAC entities of the involved stations (including the HC) on a per traffic stream basis.

Signaling instructions for the creation, modification, or deletion of traffic streams between communicating stations are sent from the higher layer signaling unit 210 to the SME 212, which provides, for those traffic streams, specific QoS parameters to the MLME 214 via QoS action primitives. The SME 212 performs cross-layer management for the communicating station, talking both to higher layers such as those initiating the QoS signaling for the traffic streams and to lower layers such as the MLME and PLME. The MLME 214 and the PLME 218 provide management activities for the MAC 216 and the PHY 220 layers while interacting with the SME on behalf of those layers. The actual MSDUs transmitted and received are sent through the MAC sublayer 216 and the PHY layer 220.

High layer signaling messages 222, with a set of QoS parameters, all of which are normally transparent to the MAC sublayer 216, are communicated from the HC 205 to the WSTA 207 in a sequence of steps. At the HC 205, the SME 212 receives instructions from the higher layer signaling unit 210 and in turn, issues QoS action primitives to the MLME 214. The QoS action primitives contain QoS action frame bodies that specify the various QoS parameters along with other information. The MAC 216 strips out the QoS action frame bodies from the QoS action primitives and uses the PHY 220 to transmit the QoS action frames to the WSTA 207 over a wireless communications link 224. A similar, but reversed set of operations is performed at the WSTA 207 to extract the QoS expectations from the QoS action frame bodies. The above descriptions apply to the case where signaling is initiated from the HC. Higher layer signaling messages may also be passed to the SME at the WSTA directly from the higher layer signaling unit at the WSTA, and communicated to the HC. In this case, the signaling is initiated from the WSTA.

Figure 2B:
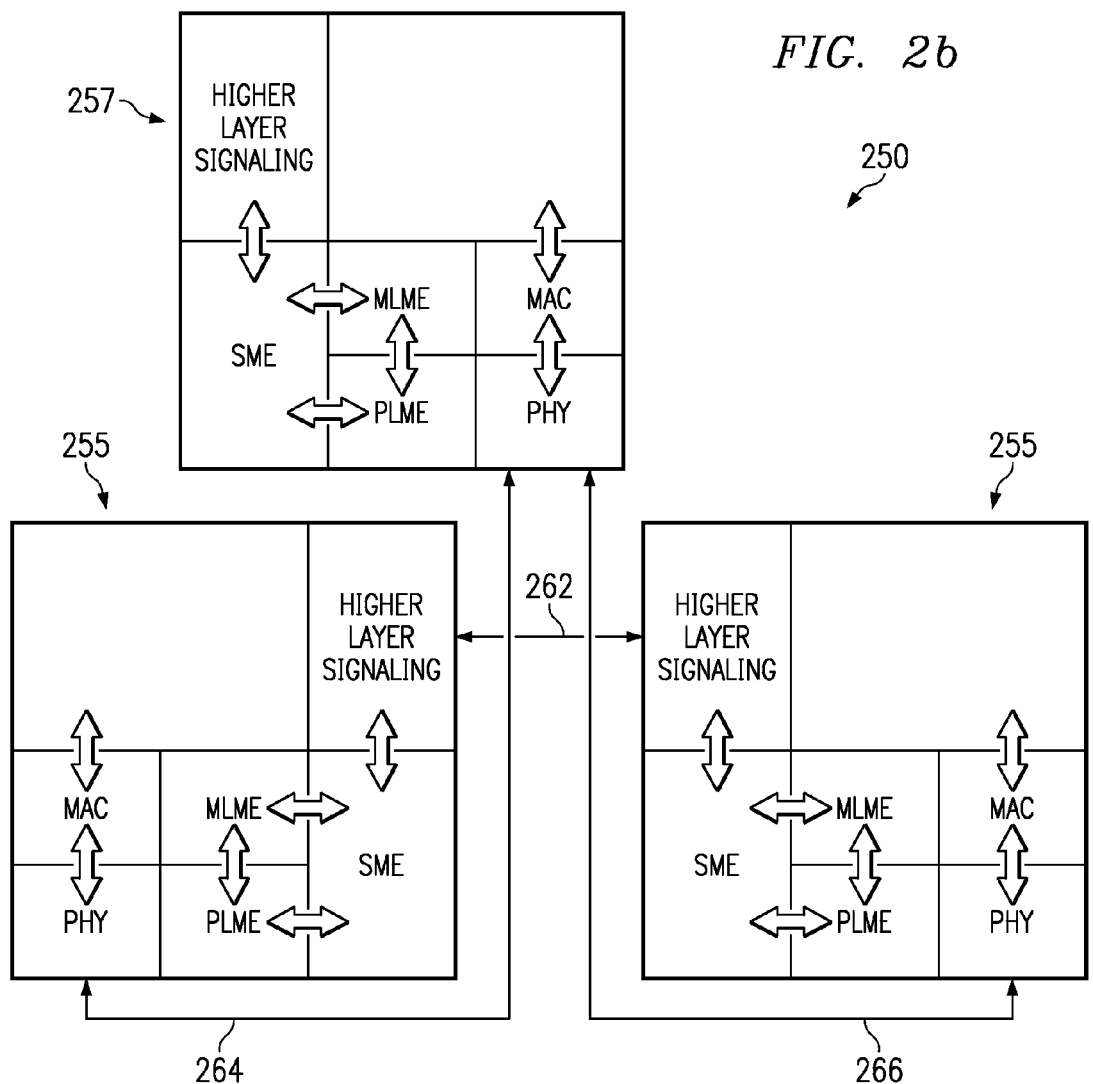

Referring now to FIG. 2b, a diagram illustrates the creation, modification, and deletion of a traffic stream between two communicating stations when the stations are both WSTAs according to a preferred embodiment of the present invention. Since hybrid coordinators are in charge of managing and allocating channel bandwidth, the traffic stream must be established by a HC 257. Therefore, the high layer signaling messages 262, transmitted from one WSTA to the other WSTA, is actually performed in two steps. A first step involves the first WSTA transmitting the QoS action frames to the HC 257 over link 264 and the second step involves the HC 257 transmitting the QoS action frames to the second WSTA over link 266. Once the QoS action frames are sent and the HC 257 has allocated transmission time (i.e., channel bandwidth), the WSTAs can communicate directly without having to transmit to the HC 257.

QoS action primitives are mechanisms created to support the adding, modifying, and deleting of traffic streams. The action primitives are created in either the SME and issued to the MLME of a communicating station or in the MLME and issued to the SME of the communicating station. The QoS action primitives contain, along with other information, QoS action frame bodies, which in turn contain the values of the QoS parameters to be exchanged between the MAC entities of the involved stations (including the HC). There are two classes of QoS action primitives, an add traffic stream action, which has a secondary usage of modifying an existing traffic stream, and a delete traffic stream action. Each class of QoS action primitive has four different types: request, confirm, indication, and response, while a QoS action frame may be a request or a response.

Referring now to FIGS. 3a-h, diagrams illustrate the structure for the different QoS action primitives and associated types according to a preferred embodiment of the present invention. Each QoS action primitive contains a QoS action frame body of a corresponding QoS action frame as part of the parameters. The QoS action frame body defines the actual traffic characteristics and QoS parameters of a traffic stream. Detailed descriptions for the generation, use, and effects of the various QoS action primitives are discussed below.

Figure 3A:
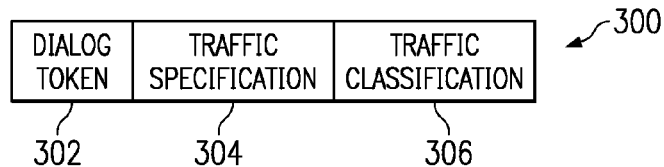

Referring now to FIG. 3a, a diagram illustrates the structure of a QoS action primitive used to request the addition (or modification) of a traffic stream, MLME-ADDTS.request 300, according to a preferred embodiment of the present invention. This primitive requests the addition (or modification) of a traffic stream. A dialog token field 302 specifies a number unique to the QoS action primitive and action frame, i.e., a primitive and frame transaction number unique in the course of carrying out the traffic stream addition action. A traffic specification field 304 specifies a source and a destination address of the communicating stations, a TAID (traffic stream identifier and association identifier), and any desired traffic characteristics and QoS parameters of the traffic stream. A traffic classification field 306 specifies a search order, classifier type, and classifier for use in classifying incoming MSDUs to traffic streams. Traffic classifiers will be discussed below. The MLME-ADDTS.REQUEST 300 modifies an existing traffic stream if the TAID contained in the primitive corresponds to the TAID of an existing traffic stream. The MLME-ADDTS.REQUEST 300 may be generated in the SME of either the source or destination station of the traffic stream, or at the SME of the HC.

Figure 3B:
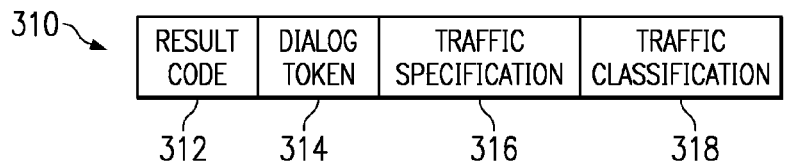

Referring now to FIG. 3b, a diagram illustrates the structure of a QoS action primitive used to confirm the results of a request for the addition (or modification) of a traffic stream, MLME-ADDTS.CONFIRM 310, according to a preferred embodiment of the present invention. A result code field 312 reports the result of the MLME-ADDTS.REQUEST specified with a dialog token field 314, with the possible result codes being: SUCCESS, INVALID PARAMETERS, and TIMEOUT, for example. If the MLME-ADDTS.REQUEST action primitive was issued by an HC, then the traffic specification specified in the traffic specification field 316 is the same as the traffic specification specified in the MLME-ADDTS.REQUEST, but it may be different if the MLME-ADDTS.REQUEST action primitive was issued by a WSTA. Reasons for changing the traffic specification are discussed below. Remaining fields in the structure: dialog token 314, traffic specification 316, and traffic classification 318 fields are as described previously. According to a preferred embodiment of the present invention, the MLME-ADDTS.CONFIRM 310 is generated by the MLME of the station whose SME issued the corresponding MLME-ADDTS.REQUEST.

Referring now to FIG. 3c, a diagram illustrates the structure of a QoS action primitive used to indicate an initiation of adding (or modifying) a traffic stream by a specified peer MAC entity, MLME-ADDTS.INDICATION 320, according to a preferred embodiment of the present invention. This QoS action primitive is generated by the MLME of a station as a result of the receipt of an initiation to add (or modify) a traffic stream at the MAC entity of that same station in the form of an Add TS request action frame. The fields of this QoS action primitive are the same as those of the MLME-ADDTS.REQUEST action primitive. The fields in the structure include dialog token 322, traffic specification 324, and traffic classification 326 and are as described previously.

Referring now to FIG. 3d, a diagram illustrates the structure of a QoS action primitive used to respond to the initiation of a traffic stream addition (or modification) by a specified WSTA MAC entity, MLME-ADDTS.RESPONSE 330, according to a preferred embodiment of the present invention. A result code field 332 reports the result of the MLME-ADDTS.INDICATION specified with a dialog token field 334, with the possible result codes being: SUCCESS, INVALID PARAMETERS, and TIMEOUT, for example. This QoS action primitive is generated by the SME at the HC as a result of an MLME-ADDTS.INDICATION action primitive and approves or changes the addition (or modification) of a traffic stream as specified by the MAC entity of the WSTA. The remaining fields in the structure: dialog token 334, traffic specification 336, and traffic classification 338 are as described previously. If the MLME-ADDTS.INDICATION was generated at the HC, an ADD TS RESPONSE ACTION FRAME is sent from the HC to the communicating station of the traffic stream that initiated the corresponding MLME-ADDTS.REQUEST.

Referring now to FIG. 3e, a diagram illustrates the structure of a QoS action primitive used to request the deletion of a traffic stream with a specified peer MAC entity or entities, MLME-DELTS.REQUEST 340, according to a preferred embodiment of the present invention. This QoS action primitive initiates a traffic stream deletion procedure, with a dialog token field 342 specifying a unique action primitive and frame transaction number used in the course of carrying out the deletion action. The traffic specification field 344 defines the traffic stream to be deleted. The MLME-DELTS.REQUEST 340 may be generated at the SME of either the source or destination station of the traffic stream, or at the SME of the HC.

Referring now to FIG. 3f, a diagram illustrates the structure of a QoS action primitive used to confirm the results of a traffic stream deletion attempt, MLME-DELTS.CONFIRM 350, according to a preferred embodiment of the present invention. A result code field 352 reports the result of the MLME-DELTS.REQUEST specified with a dialog token field 354, with the possible result codes being: SUCCESS, INVALID PARAMETERS, and TIMEOUT, for example. This QoS action primitive is generated by the MLME as a result of an MLME-DELTS.REQUEST action primitive. The remaining fields in the structure: dialog token 354 and traffic specification 356 are as described previously. The MLME-DELTS.CONFIRM 350 is generated by the MLME of the station whose SME issued the corresponding MLME-DELTS.REQUEST.

Referring now to FIG. 3g, a diagram illustrates the structure of a QoS action primitive used to indicate the initiation of a QoS action primitive to delete a traffic stream by a peer MAC entity, MLME-DELTS.INDICATION 360, according to a preferred embodiment of the present invention. This QoS action primitive is generated by the MLME of a station as a result of the receipt of an initiation to delete a traffic stream at the MAC entity of that same station in the form of a DEL TS ACTION FRAME. The remaining fields in the structure: dialog token 362 and traffic specification 364 are as described previously.

Referring now to FIG. 3h, a diagram illustrates the structure of a QoS action primitive used to respond to an initiation of a traffic stream deletion by a WSTA MAC entity, MLME-DELTS.RESPONSE 370, according to a preferred embodiment of the present invention. A result code field 372 reports the result of the MLME-DELTS.INDICATION specified with a dialog token field 374, with the possible result codes being: SUCCESS, INVALID PARAMETERS, and TIMEOUT, for example. This primitive is generated by the MLME at the HC as a result of an MLME-DELTS.INDICATION to initiate deletion of a traffic stream with a peer MAC entity or entities not located at the HC or the initiation station. Remaining fields in the structure: dialog token 374 and traffic specification 376 are as described previously. A DEL TS ACTION FRAME is sent from the HC to the aforementioned peer MAC entity or entities.

QoS action frame bodies are actually carried inside QoS action primitives and extracted from, or inserted into, the action primitives while inside the SME and MLME, respectively, of the communicating stations or the HC. The action frames are used to transmit the QoS expectations, along with other information, between communicating stations or the HC via the PHY layer of the stations or the HC and over-the-air. QoS action frame bodies are extracted from the QoS action primitives in the MAC sublayer of the station issuing the primitive and inserted into QoS action frames for transmission to a peer MAC entity or entities, while QoS action frame bodies are extracted from the QoS action frames in the MAC sublayer of the station receiving the frame and inserted into QoS action primitives for being passed to the local SME.

Referring now to FIGS. 4a-e, diagrams illustrate the frame body structure of the request and response action frames for adding, modifying, and deleting traffic streams according to a preferred embodiment of the present invention.

Referring now to FIG. 4a, a diagram illustrates a request action frame body 400, comprising a category code field 402, an action code field 404, an activation delay field 406, a dialog token field 408, and an action-specific field 410. The category code field 402 identifies a group of actions for a particular function and the action code field 404 specifies a specific management action in a given group.

Referring now to FIG. 4b, a diagram illustrates a response action frame body 420, comprising a category code field 422, an action code field 424, an action specific status field 426, a dialog token field 428, and an action-specific field 430. The action specific status field indicates the completion status of a corresponding action request.

Referring now to FIG. 4c, a table illustrates various action codes for the QoS category according to a preferred embodiment of the present invention. The action codes listed in the table represent the possible contents of the action code fields 404 and 424 in the QoS management category of the action frame bodies 400 and 420 illustrated in FIGS. 4a and 4b, respectively. Action codes 0 (ADD TS REQUEST) and 2 (DEL TS) are usable only in action request frames (FIG. 4a) while action code 1 (ADD TS RESPONSE) is usable in action response frames (FIG. 4b). Note that according to a preferred embodiment of the present invention, only even valued actions codes are permitted in request action frames and odd valued action codes are permitted in response action frames.

Referring now to FIGS. 4d-e, diagrams illustrate specific action frame bodies for adding (or modifying) and deleting traffic streams according to a preferred embodiment of the present invention.

Referring now to FIG. 4d, a diagram illustrates an ADD TS ACTION FRAME body. The ADD TS ACTION FRAME body comprises the specific fields as previously described with an exception given to the action-specific fixed fields and/or elements field 410 which is partitioned into two sub-fields, a TSpec element sub-field and a TClas element sub-field. The specifics of the TSpec and TClas element sub-fields will be described below.

Referring now to FIG. 4e, a diagram illustrates a DEL TS ACTION FRAME body and once again the DEL TS ACTION FRAME body comprises the specific fields as previously described. In the DEL TS ACTION FRAME, the action-specific fixed fields and/or elements field 410 becomes a TSpec element field.

Figure 5A:
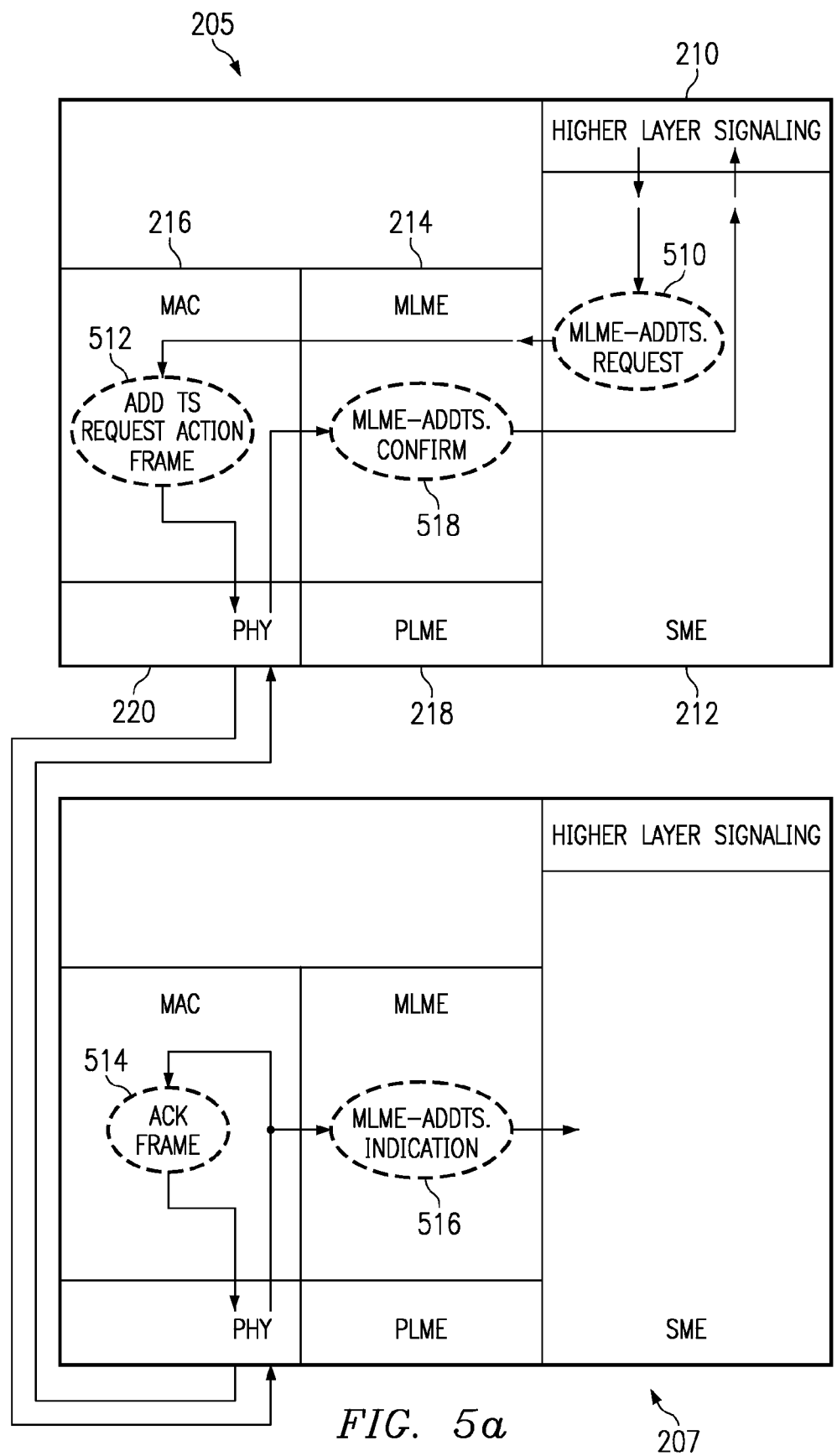
FIGS. 5a and 5b illustrate the exchange of QoS action primitives and action frames in the creation, modification, or deletion of traffic streams between management entities or communicating stations according to a preferred embodiment of the present invention.

Referring now to FIG. 5a, a diagram illustrates the path taken by QoS action primitives and action frames through the communicating stations and the hybrid coordinator when the QoS action is initiated by the hybrid coordinator 205 and communicated to a wireless station 207 according to a preferred embodiment of the present invention. As discussed previously, a QoS action primitive contains a QoS action frame body that specifies various traffic characteristics and QoS parameters of a particular traffic stream. Since typical IEEE 802.11 communications traffic does not provide for association of traffic characteristics and QoS parameters to specific MSDUs, an operation wherein the traffic characteristics and QoS parameters of a traffic stream are communicated to the MAC and management entities of the communicating stations and the hybrid coordinator is needed.

The QoS signaling is initiated in the higher layer signaling unit 210 of the HC 205. The higher layer signaling unit 210 issues a QoS action signal for creating, modifying, or deleting a traffic stream, and provides the traffic characteristics and QoS parameters for the traffic stream to the SME 212, which in turn, creates a QoS action primitive, MLME-ADDTS.REQUEST (in the case of adding or modifying a traffic stream) 510 (or MLME-DELTS.REQUEST (in the case of deleting a traffic stream)). The MLME-ADDTS.REQUEST 510 contains a QoS action frame body that specifies the traffic characteristics and QoS parameters provided by the higher layer signaling unit 210 for the traffic stream. The MLME-ADDTS.REQUEST 510 is issued to the MLME 214, which relays it to the MAC sublayer 216. The MAC sublayer 216 extracts the QoS action frame body from the QoS action primitive and creates an ADD TS REQUEST ACTION FRAME 512 and passes the action frame to the PHY layer 220. The PHY layer 220 transmits the ADD TS REQUEST ACTION FRAME 512 to the WSTA 207.

The PHY layer of the WSTA 207 receives the ADD TS REQUEST ACTION FRAME 512 and passes the action frame to its own MAC sublayer, wherein the MAC sublayer automatically generates an ACKNOWLEDGMENT FRAME (ACK FRAME) 514. Notice that the ACKNOWLEDGMENT FRAME 514 is in response to only the receipt of the ADD TS REQUEST ACTION FRAME 512 and is not an acknowledgment of the contents of the ADD TS REQUEST ACTION FRAME 512. Upon receipt of the ACKNOWLEDGMENT FRAME 514 the HC 205 issues an MLME-ADDTS.CONFIRM primitive 518 from its MLME back to its SME, reporting the processing status of the previous MLME-ADDTS.REQUEST 510 issued by that SME. At the WSTA 207, the MAC sublayer relays the received ADD TS REQUEST ACTION FRAME to the MLME wherein the MLME creates a QoS action primitive, MLML-ADDTS.INDICATION 516, from the ADD TS REQUEST ACTION FRAME 512 and issues the QoS action primitive to the SME. The SME of the WSTA 207 processes the contents of the QoS action primitive, and the traffic stream between the HC 205 and the WSTA 207 is created. The same path is taken for modifying an existing traffic stream by using the traffic stream identifier (TSID) for that traffic stream in the QoS action primitives and frames. A similar path is taken for deleting an existing traffic stream.

Figure 5B:
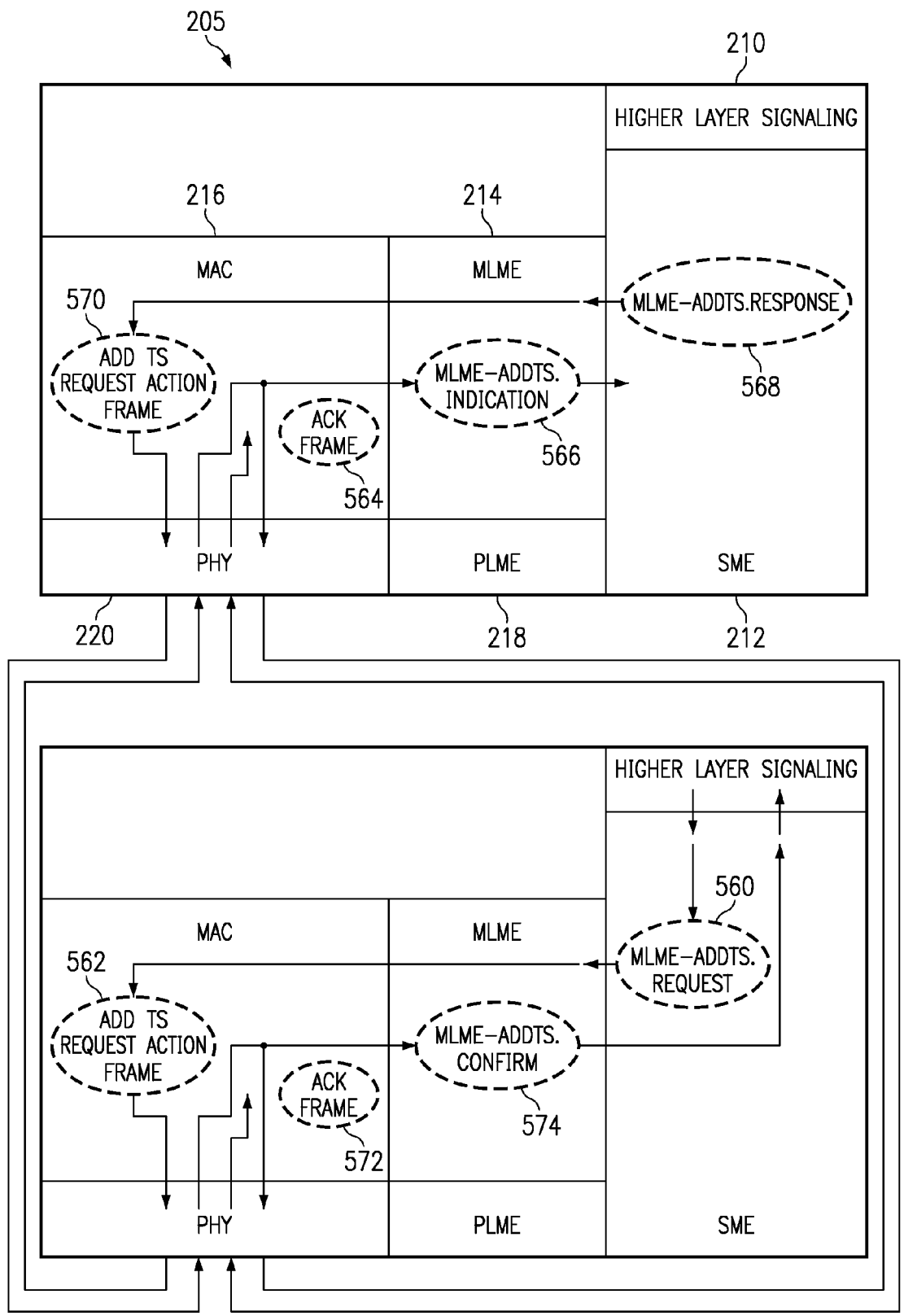

Referring now to FIG. 5b, a diagram illustrates the path taken by QoS action primitives and action frames through the communicating stations and the hybrid coordinator when the QoS action is initiated by a wireless station according to a preferred embodiment of the present invention. The QoS signaling is initiated in the higher layer signaling unit of the WSTA 207. The higher layer signaling unit issues a QoS action signal for creating, modifying, or deleting a traffic stream, and provides the traffic characteristics and QoS parameters of the traffic stream to the SME, which in turn, creates a QoS action primitive, MLME-ADDTS.REQUEST (in the case of adding or modifying a traffic stream) 560 (or MLME-DELTS.REQUEST (in the case of deleting a traffic stream)). The MLME-ADDTS.REQUEST 560 contains QoS action frame body that specifies the traffic characteristics and QoS parameters provided by the higher layer signaling unit for the traffic stream. The MLME-ADDTS.REQUEST 560 is issued to the MLME, which relays it to the MAC sublayer of the WSTA 207. The MAC sublayer extracts the QoS action frame body from the QoS action primitive and creates an ADD TS REQUEST ACTION FRAME 562 and passes the action frame to the PHY layer. The PHY layer transmits the ADD TS REQUEST ACTION FRAME 562 to the HC 205.

The PHY layer of the HC 205 receives the ADD TS REQUEST ACTION FRAME 562 and passes the action frame to its own MAC sublayer, wherein the MAC sublayer automatically generates an ACKNOWLEDGMENT FRAME (ACK FRAME) 564. Notice that the ACKNOWLEDGMENT FRAME 564 is in response to only the receipt of the ADD TS REQUEST ACTION FRAME 562 and is not an acknowledgment of the contents of the ADD TS REQUEST ACTION FRAME 562. At the HC 205, the MAC sublayer relays the received ADD TS REQUEST ACTION FRAME 562 to the MLME wherein the MLME creates a QoS action primitive, MLML-ADDTS.INDICATION 566, from the ADDTS.REQUEST frame 562 and issues the QoS action primitive to the SME. The SME of the HC 205 processes the contents of the QoS action primitive and creates another QoS action primitive, MLME-ADDTS.RESPONSE 568. The purpose of the MLME-ADDTS.RESPONSE 568 is to provide a response back to the WSTA 207. The response provides a set of traffic characteristics and QoS parameters that the HC 205 is able (or willing) to accommodate for the traffic stream. For example, the WSTA 207 may request a set of QoS parameters that the HC 205 does not have sufficient channel bandwidth to meet. Alternatively, the WSTA 207 may request more bandwidth than the HC 205 is willing to allocate to one traffic stream. Therefore, the response action primitive provides a set of traffic characteristics and QoS parameters that the HC 205 approves for the traffic stream.

The MLME-ADDTS.RESPONSE 568 primitive is issued to the MLME and then relayed to the MAC sublayer of the HC 205, where the MAC sublayer strips the QoS action frame body, creates an ADD TS RESPONSE ACTION FRAME 570, and passes the action frame to the PHY layer 220. The PHY layer 220 of the HC 205 transmits the ADD TS RESPONSE ACTION FRAME to the PHY layer of the WSTA 207. Upon receipt of the action frame from the HC 205, the PHY layer of the WSTA 207 passes the received action frame to the MAC sublayer. The MAC sublayer, in response to the received action frame, generates an acknowledgment frame 572 that is returned to the HC 205. The MAC sublayer relays the ADD TS RESPONSE ACTION FRAME 570 to the MLME, where a QoS action primitive, MLME-ADDTS.CONFIRM 574, is created from the ADD TS RESPONSE ACTION FRAME 570. The MLME-ADDTS.CONFIRM primitive 574 is then issued to the SME of the WSTA 207. The SME of the WSTA 207 processes the contents of the QoS action primitive, and the traffic stream between the WSTA 207 and the HC 205 is created. Should the HC 205 modify any of the QoS parameters requested by the WSTA 207, the SME at the WSTA 207 provides the changes to the higher layer signaling unit. The same path is taken for modifying an existing traffic stream by using the traffic stream identifier (TSID) for that traffic stream in the QoS action primitives and frames. A similar path is taken for deleting an existing traffic stream.

Referring now to FIGS. 6a-b, diagrams illustrate the structure of a traffic specification (TSpec) element for use in specifying the traffic characteristics and QoS parameters of a traffic stream according to a preferred embodiment of the present invention.

Referring now to FIG. 6a, a diagram illustrates a format of the traffic specification element for defining the traffic characteristics and QoS parameters. The traffic characteristics and QoS parameters are placed in a traffic specification element and communicated to the MAC sublayer of the hybrid coordinator (HC) and wireless station(s) (WSTA) that may be either the source or destination of the traffic stream.

In addition to the traffic characteristics and QoS parameters, the traffic specification element includes the following fields, with their preferred sizes: a one-octet element ID field (601) identifying the traffic specification element, a one-octet length field (603) indicating the length in units of octets of the following fields in this traffic specification element, a six-octet source address field (605) of the traffic stream, a six-octet destination address field (607) of the traffic stream, a two-octet traffic stream identifier and association identifier (TAID) field (609) formed as a concatenation of the traffic stream identifier (TSID) of the traffic stream and an association identifier (AID) of a wireless QoS station (WSTA) to identify the traffic stream in the context of the WSTA in a QoS basic service set (QBSS), and a one-octet traffic stream information (TS Info) field (611) providing additional information about the traffic stream. Further information related to these fields can be found in the IEEE 802.11e/D2.0a draft standard.

Referring now to FIG. 6b, a diagram illustrates the structure of the TSInfo field 611 in greater detail according to a preferred embodiment of the present invention. The TSInfo field 611 is preferably an eight-bit field, partitioned into five sub-fields. A one-bit traffic type sub-field 652 specifies the traffic pattern of the traffic stream, either isochronous or asynchronous. A one-bit bi-direction sub-field 654 specifies if the traffic stream is either uni- or bi-directional. A two-bit acknowledgment policy sub-field 656 specifies the expected acknowledgment policy. A one-bit forward error correction (FEC) sub-field 658 specifies the FEC usage on the traffic stream. A delivery priority sub-field 660 specifies a relative priority for use on the data transfer of the traffic stream when prioritization is required.

Referring back to FIG. 6a, the remainder of the traffic specification element is used to define the traffic characteristics and QoS parameters of the traffic stream. The traffic characteristics and QoS parameters may include, but are not necessarily limited to: a retry interval field (613) specifying a maximum amount of time units (preferably eight millisecond units) that can elapse as the transmitting station waits to receive an acknowledgment to a previously transmitted frame of the traffic stream before the transmitting station initiates a retransmission of that frame, an inactivity interval field (615) specifying a maximum amount of time units (preferably eight millisecond units) that can elapse without the arrival or transfer of an MSDU belonging to the traffic stream before the traffic stream is deleted by the MAC at the HC, and an interarrival interval field (617) specifying a nominal interarrival interval of MSDUs belonging to the traffic stream which may be used by the HC as a guide in scheduling the data transfer of the traffic stream.

Additional traffic characteristics and QoS parameters contained in the traffic specification element include: a nominal MSDU size field (619) specifying a nominal size of MSDUs belonging to the traffic stream, a minimum data rate field (621) specifying a minimum data rate in units (preferably in kilobits per second) for the data transfer of the traffic stream, a mean data rate field (623) specifying a nominal sustained data rate in units (preferably in kilobits per second) for the data transfer of the traffic stream, a maximum burst size field (625) specifying a maximum data burst in units (preferably in eight octet units) of MSDUs belonging to the traffic stream, a delay bound field (627) specifying a maximum time in units (preferably in eight millisecond units) allowed to transport an MSDU belonging to the traffic stream, and a jitter bound field (629) specifying a maximum acceptable delay difference in the transport of MSDUs belonging to the traffic stream. According to a preferred embodiment of the present invention, any unspecified QoS parameter is set to zero and denotes that the unspecified parameter is not to be used.

As discussed previously, a number of QoS action primitives and action frames have a traffic classification element (see discussion of FIGS. 3a-h). The traffic classification element contains a set of parameters necessary to identify (associate) incoming MSDUs with a particular traffic stream to which they belong.

Referring now to FIG. 7, a diagram illustrates the structure of a traffic classification (TClas) element 700 according to a preferred embodiment of the present invention. The element 700 includes a search priority field (709), a classifier type field (711), and a frame classifier field (713). The search priority field 709 specifies a search order for this particular frame classification relative to other frame classifiers maintained in a classification table (not shown) located above the MAC service access point (SAP) at a QoS station (QSTA). According to a preferred embodiment of the present invention, the frame classifiers are used in order of ascending integer values (unsigned) of the search priority maintained in the classification table until the MSDU is matched with a frame classifier or the set of frame classifiers in that table is exhausted.

The classifier type field 711 specifies the type of frame classifier in the traffic classification. According to a preferred embodiment of the present invention, a set of possible classifier types and the frame classifier field 713 contents are as follows:

| Classifier Type | Frame Classifier Contents |
| --- | --- |
| 0 | Traffic stream identifier (TSID) |
| 1 | TCP UDP source and destination port |
| 2 | IEEE 802.2 LLC DSAP and SSAP addresses |
| 3 | IEEE 802.1Q tag header, IEEE 802.1D user priority, IEEE 802.1Q VLAN ID |
| 4 | IEEE 802.3 MAC header destination and source addresses and type |
| Other | Reserved |

Referring now to FIGS. 8a-c, diagrams illustrate examples of QoS action primitives and action frames sent (transmitted) between communicating stations (including the HC) to add, modify, and delete traffic streams according to a preferred embodiment of the present invention.

Referring now to FIG. 8a, a diagram illustrates an HC initiated addition (or modification) of a traffic stream between the HC and a WSTA according to a preferred embodiment of the present invention. The addition begins when the SME of the HC generates an MLME-ADDTS.REQUEST action primitive and issues it to the MAC of the HC 802. The MAC strips the embedded ADD TS REQUEST ACTION FRAME body from the MLME-ADDTS.REQUEST action primitive and transmits it to the MAC of the WSTA 804. The transmission between the MACs of the HC and the WSTA is performed via the PHY layer of the HC, wireless transmission over-the-air, and the PHY layer of the WSTA.

The MAC of the WSTA returns an ACK FRAME to the MAC of the HC to acknowledge the receipt of the ADD TS REQUEST ACTION FRAME 806. After receiving the ACK FRAME from the WSTA, the MAC of the HC generates an MLME-ADDTS.CONFIRM action primitive and issues it to the SME of the HC 808. The MAC of the WSTA generates an MLME-ADDTS.INDICATION action primitive and issues it to the SME of the WSTA 810.

Referring now to FIG. 8b, a diagram illustrates an inactivity initiated deletion of an existing traffic stream according to a preferred embodiment of the present invention. The MAC of an HC notices that a particular traffic stream has been idle for a time period that is greater than the inactivity interval specified in the traffic specification element for that traffic stream, and thus issues an MLME-DELTS.INDICATION action primitive to the SME of the HC 812. The SME generates an MLME-DELTS.RESPONSE action primitive in response to the MLME-DELTS.INDICATION and issues it to the MAC of the HC 814. The MAC of the HC also creates a DEL TS ACTION FRAME and transmits it to the MAC of the WSTA associated with the traffic stream 816. The MAC of the WSTA sends an ACK FRAME back to the HC in response to the receipt of the DEL TS ACTION FRAME 818. Finally, the MAC of the WSTA generates an MLME-DELTS.INDICATION action primitive and transfers it to the SME of the WSTA 820.

Referring now to FIG. 8c, a diagram illustrates a source WSTA initiated deletion of a traffic stream between a source WSTA (WSTA1) and a destination WSTA (WSTA2) according to a preferred embodiment of the present invention. The deletion begins with the SME of WSTA1 generating an MLME-DELTS.REQUEST action primitive and issuing it to the MAC of WSTA1 822. The MAC of WSTA1 strips the DEL TS ACTION FRAME body that is embedded in the MLME-DELTS.REQUEST action primitive and transmits it to the MAC of the HC 824. The MAC of the HC returns an ACK frame to the MAC of the WSTA1 in response to the receipt of the DEL TS ACTION FRAME 826.

The MAC of WSTA1 generates an MLME-DELTS.CONFIRM action primitive and issues it to the SME of WSTA1 828. At the same time, the MAC of the HC generates an MLME-DELTS.INDICATION action primitive and transfers it to the SME of the HC 830. In response to the MLME-DELTS.INDICATION action primitive, the SME of the HC generates an MLME-DELTS.RESPONSE action primitive and issues it to the MAC of the HC 832. The MAC of the HC strips the DEL TS ACTION FRAME body embedded in the MLME-DELTS.RESPONSE action primitive and transmits it to the MAC of WSTA2 834. The MAC of WSTA2 returns an ACK FRAME to the MAC of the HC in response to the receipt of the DEL TS ACTION FRAME 836. The MAC of WSTA2 generates an MLME-DELTS.INDICATION action primitive and issues it to the SME of WSTA2 838.

Referring now to FIG. 9, a diagram illustrates an example of the use of traffic streams according to a preferred embodiment of the present invention. As displayed in FIG. 9, there are two originators within a local QBSS 900 controlled by a single HC 910, with each of the two originators on separate WSTAs 920 and 930 and the destination parties located outside of the QBSS. Let a first originator and destination pair be involved in a voice call 925 and a second originator and destination pair be involved in an Internet web browsing session 935. Since both sessions are bi-directional in nature, a total of four uni-directional traffic streams are required.

Assuming that the voice call 925 is equally sampled at a rate of 64 kbps in each direction, packetized every 20 ms and transmitted over UDP/IP. Then the two voice traffic streams may be combined into a bi-directional traffic stream specified by a single TSPEC. This TSPEC may then specify an TID subfield of 8 in the TAID field, an inactivity interval of 5 minutes, an interarrival interval of 20 ms, a nominal MSDU size of 188 bytes, a minimum data rate of 75.2 kbps, a delay bound of 50 ms, and a jitter bound of 40 ms, along with an isochronous traffic type and a true bi-directional value.

On the other hand, assume a 5 percent duty cycle for the web browsing session 935, meaning that the user is actively sending and receiving traffic 5 percent of the time (on average). While the user is active, the outbound traffic leaves at 144 kbps over TCP/IP with an average packet size of 360 bytes, while inbound traffic arrives at 1.544 mbps over TCP/IP with an average packet size of 772 bytes. Due to this traffic asymmetry, two uni-directional traffic streams are needed. The TSPEC for the outbound traffic stream may specify a TID subfield of 13 in the TAID field, an inactivity interval of 20 minutes, an interarrival interval of 20 ms, a nominal MSDU size of 360 bytes, a minimum data rate of 144 kbps (measured over active periods), a mean data rate of 14.4 kbps (measured over both active and inactive periods), and a delay bound of 500 ms, as well as an asynchronous traffic type and a false bidirectional value. The TSPEC for the inbound traffic stream may specify a TID subfield of 13 in the TAID field, an inactivity interval of 20 minutes, an interarrival interval of 4 ms, a nominal MSDU size of 772 bytes, a minimum data rate of 1.544 mbps (measured over active periods), a mean data rate of 154.4 kbps (measured over both active and inactive periods), and a delay bound of 1 second, as well as an asynchronous traffic type and a false bi-directional value.

Based on the TSPEC and available bandwidth, the HC 910 makes an admission control decision on the voice call and the web browsing session, i.e., the HC 910 decides if either or both or neither of the traffic streams are to be created. If both are allowed, both TSPEC parameters are provided to the MAC entities at the HC 910 and the source/destination WSTAs 920 and 930 within the QBSS 900, using the earlier discussed signaling procedure. The HC 910 schedules quasi-periodic transmission times for both directions of the voice traffic stream 925. The HC 910 schedules the transmission times for the voice traffic stream 925 due to the low latency requirements of a voice connection. The inter-transmission interval is preferably 20 ms to match the interarrival interval; it may be smaller than 20 ms to allow for retransmissions, but must not be larger than 40 ms (the minimum of the delay bound and the jitter bound) in order to meet both delay and jitter requirements. Each transmission time duration must be at least usable for transferring an MSDU of 188 bytes. The HC 910 will delete the voice traffic stream 925 for each direction if no voice MSDUs in each direction are found over an interval of 5 minutes.

The HC 910 schedules transmission times for each of the two uni-directional web browsing traffic streams 935 when there are MSDUs waiting for transmission. The HC 910 finds MSDUs buffered for transmission from the HC 910 to the involved WSTA 930 of the web traffic direction directly from its local transmit buffer, and discovers MSDUs buffered for transmission from the involved WSTA 930 of the web traffic to the HC indirectly from the remote traffic report as send from that WSTA 930. When there are MSDUs to send from the HC 910 to the WSTA 930, the HC will arrange transmission times within 1 second of their arrivals, with each transmission time being usable for transferring at least an MSDU of 772 bytes. The HC 910 must schedule enough transmission time to produce a minimum data rate of 144 kbps for the WSTA-HC transfer and a minimum data rate of 1.544 mbps for the HC-WSTA transfer over the respective active periods. However, the HC 910 may curtail such transmission times to the equivalent mean data rates of 14.4 kpbs and 154.4 kbps on overall averages as provided by the respective TSPECs. The HC 910 will delete the web browsing traffic stream 935 for each direction if no web MSDUs in each direction are found over an interval of 20 minutes.

In scheduling transmission times for any traffic stream, the HC 910 must consider the applicable privacy and FEC added bits, the MAC and PLCP headers, and the PLCP preamble associated with each MSDU transmission. Refer to the IEEE 802.11 and IEEE 802.11e/D2.0a technical standards for a more detailed explanation of privacy and FEC bits, MAC and PLCP headers, and PLCP preambles. In making admission control decisions, the HC 910 must further consider the interframe space and appropriate acknowledgment time overheads incurred with each MSDU transfer.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for initiating a QoS action on a traffic stream with parameterized QoS expectations at a first station in a communications network, the method comprising:
   sending a QoS action signal from a higher layer signaling unit of the first station to a station management entity (SME) of the first station;
   creating a first QoS action primitive at the SME of the first station, the first QoS action primitive comprising a first QoS action frame body;
   issuing the first QoS action primitive to a medium access control (MAC) sublayer entity (MLME) of the first station;
   transmitting a first QoS action frame containing the first QoS action frame body to a second station;
   receiving an acknowledgment from the second station;
   creating a second QoS action primitive at a medium access control (MAC) sublayer of the first station; and
   issuing the second QoS action primitive to the SME of the first station.

2. The method of claim 1, wherein the first station is a source station of the traffic stream.

3. The method of claim 1, wherein the first station is a destination station of the traffic stream.

4. The method of claim 1, wherein the first station is a station containing a hybrid coordinator.

5. The method of claim 1, wherein the second station is a source station of the traffic stream.

6. The method of claim 1 wherein the second station is a destination station of the traffic stream.

7. The method of claim 1, wherein the second station is a station containing a hybrid coordinator.

8. The method of claim 1, wherein the traffic stream is a unidirectional traffic stream between the first and second stations of the traffic stream.

9. The method of claim 1, wherein the traffic stream is a bi-directional traffic stream between the first and second stations of the traffic stream.

10. The method of claim 1, wherein the first QoS action frame body contains a QoS action, and the first QoS action primitive is a request for the QoS action.

11. The method of claim 1, wherein the first QoS action frame body contains a QoS action, and the second QoS action primitive is a confirmation on the QoS action to report the status of the first QoS action primitive.

12. The method of claim 1, wherein the first QoS action frame containing the first QoS action frame body is transmitted from the first station to the second station via a MAC sublayer and a physical (PHY) layer of the first and second stations.

13. The method of claim 12, wherein the first QoS action frame body is transmitted over-the-air to the second station.

14. The method of claim 12, wherein the first QoS action frame is transmitted using radio frequency signals to the second station.

15. The method of claim 1, wherein the first QoS action frame body contains a first set of traffic characteristics and QoS parameters of the traffic stream.

16. The method of claim 15, wherein the traffic characteristics and QoS parameters is contained in a set of traffic characteristics and QoS parameters, and the set is different for different traffic streams.

17. The method of claim 16, wherein the set comprises:
a traffic stream information parameter;
a retry interval parameter;
an inactivity interval parameter;
an interarrival interval parameter;
a nominal data unit size parameter;
a minimum data rate parameter;
a mean data rate parameter;
a maximum burst size parameter;
a delay bound parameter; and
a jitter bound parameter.

18. The method of claim 17, wherein the traffic stream information parameter comprises:
a traffic type parameter;
a bi-direction type parameter;
an acknowledgment policy parameter;
an FEC usage parameter; and
a delivery priority parameter.

19. The method of claim 17, wherein the set further comprises:
a search priority parameter;
a classifier type parameter; and
a frame classifier.

20. The method of claim 1 further comprising:
at the second station:
receiving the first QoS action frame at a medium access control (MAC) sublayer of the second station;
transmitting the acknowledgment to the first station;
creating a third QoS action primitive containing the first QoS action frame body at a medium access control (MAC) sublayer entity (MLME) of the second station,
transferring the third QoS action primitive from the MLME to a station management entity (SME) of the second station;
generating a fourth QoS action primitive containing a second QoS action frame body at the SME of the second station;
transferring the fourth QoS action primitive from the SME to the MLME of the second station;
stripping the second QoS action frame body from the fourth QoS action primitive at the MAC of the second station; and
transmitting a second QoS action frame containing the second QoS action frame body to a third station.

21. The method of claim 20, wherein the first QoS action frame body contains a QoS action, and the third QoS action primitive is an indication of the receipt of the QoS action.

22. The method of claim 20, wherein the fourth QoS action primitive is a response to the third QoS action primitive.

23. The method of claim 20, wherein the second QoS action frame body contains a second set of traffic characteristics and QoS parameters of the traffic stream.

24. The method of claim 23, wherein the first QoS action frame body contains a first set of traffic characteristics and QoS parameters, and the second set of traffic characteristics and QoS parameters is the same as the first set.

25. The method of claim 23, wherein the first QoS action frame body contains a first set of traffic characteristics and QoS parameters, and the second set of traffic characteristics and QoS parameters is different as the first set.

26. The method of claim 20, wherein the third station is the same as the first station.

27. The method of claim 20, wherein the third station is different from the first station.

28. The method of claim 20, wherein the third station is the same as the first station, a first set of traffic characteristics and QoS parameters is contained in the first QoS action frame body, a second set of traffic characteristics and QoS parameters is contained in the second QoS action frame body, the method further comprising:
receiving the second QoS action frame at the MAC of the first station;
transmitting a second acknowledgment to the second station;
creating a fifth QoS action primitive containing the second QoS action frame body at the MLME of the first station;
transferring the fifth QoS action primitive to the SME of the first station; and
replacing the first set of traffic characteristics and QoS parameters of the traffic stream with the second set of traffic characteristics and QoS parameters of the traffic stream at the MAC and SME of the first station.

29. The method of claim 28, wherein the fifth QoS action primitive is a confirmation of the QoS action to report a status of the first QoS action primitive.

30. The method of claim 20, wherein the third station is different from the first station, the method further comprising:
at the third station:
receiving the second QoS action frame at a medium access control (MAC) sublayer of the third station;
transmitting a third acknowledgment frame to the second station;
creating a sixth QoS action primitive containing the second QoS action frame body at a medium access control sublayer management entity (MLME) of the third station; and
transferring the sixth QoS action primitive from the MLME to a station management entity (SME) of the third station.

31. The method of claim 1, wherein the first QoS action frame body contains a QoS action, and the QoS action on the traffic stream involves the creation of a new traffic stream.

32. The method of claim 1, wherein the first QoS action frame body contains a QoS action, and the QoS action of the traffic stream involves the modification of an existing traffic stream.

33. The method of claim 32, wherein the first QoS action frame body contains a traffic stream identifier of the existing traffic stream.

34. The method of claim 32, wherein the first QoS action frame body contains a third set of traffic characteristics and QoS parameters of the traffic stream in addition to a first set of traffic characteristics and QoS parameters of the traffic stream.

35. The method of claim 34, wherein the third set of traffic characteristics and QoS parameters of the traffic stream is different from the first set of traffic characteristics and QoS parameters used for the existing traffic stream.

36. The method of claim 34 further comprising the step of using the third set of traffic characteristics and QoS parameters to modify the traffic stream after the second issuing step.

37. The method of claim 1, wherein the first QoS action frame body contains a QoS action, and the QoS action on the traffic stream involves the deletion of an existing traffic stream.

38. The method of claim 37, wherein the first QoS action frame body contains a traffic stream identifier of the existing traffic stream.

39. The method of claim 38 further comprising the step of deleting an existing traffic stream with a traffic stream identifier matching the traffic stream identifier specified in the first QoS action frame body after the second issuing step.

40. A method for communicating with parameterized QoS expectations in a communications network having a source station comprising: a higher layer signaling unit, a station management entity (SME), a MAC layer management entity (MLME), and a PHY layer management entity (PLME), said method comprising:
creating a set of parameterized QoS expectations, further comprising:
receiving the set of parameterized QoS expectations from the higher layer signaling unit at the SME;
generating a QoS action primitive with the parameterized QoS expectations provided in the set of parameterized QoS expectations;
transferring the QoS action primitive to the MLME;
transmitting the set to the destination station;
receiving an acknowledgment from the destination station to establish a communications link;
commencing communications based on limitations of the set using the communications link; and
deleting the communications link after the commencing step completes.

41. The method of claim 40, wherein the creating step further comprises:
extracting a QoS action frame from the QoS action primitive; and
providing the QoS action frame to a PHY layer of the source station.

42. The method of claim 40, wherein there are a plurality of messages transmitted in the communications network, and each message is transmitted using a different set of parameterized QoS expectations.

* * * * *